United States Patent Office 2,830,169
Patented Apr. 8, 1958

2,830,169

SPOT OR SEAM WELDING OF MOLYBDENUM AND TUNGSTEN BY MEANS OF RHENIUM INTERLAYERS

Gustav K. Medicus, Dayton, Ohio

No Drawing. Application August 8, 1956
Serial No. 602,943

7 Claims. (Cl. 219—92)

(Granted under Title 35, U. S. Code (1952), sec. 266)

The invention described herein may be manufactured and used by or for the United States Government for governmental purposes without payment to me of any royalty thereon.

The invention relates to an improved process for uniting molybdenum and tungsten sheets by spot or seam electric resistance welding using an interlayer of rhenium between the sheets being joined.

When it is attempted to make a joint between thin molybdenum or tungsten sheets by spot or seam welding, the welds so formed are brittle with a very low mechanical strength. In the case of molybdenum sheets, improved results can be obtained by copper plating the areas to be joined and spot or seam welding through the copper interface which in effect joins the sheets by brazing. Such joints are, however, not suitable for use at high temperatures of the order of about 600°–1000° C. or higher.

Electric spot or seam welds have also been made, for use at high temperatures, in both molybdenum and tungsten employing a thin film of columbium (niobium) or tantalum as an interlayer between the sheets at the joints. Such welds are satisfactory for use at high temperatures except where such gases as free hydrogen, nitrogen or oxygen are present. In the presence of these gases, the spot welds are attacked at the columbium or tantalum interlayer causing weld failure. Further special precautions are necessary in the welding process to exclude these gases by a protective atmosphere or by performing the welding under water. See the work "Rare Metals Handbook," edited by Clifford A. Hampel and published in 1954 by the Reinhold Publishing Corporation, New York, pages 286, 400–1 and 496.

It is an object of this invention to provide a spot or seam electric resistance welding process for joining thin sheets of molybdenum, tungsten, and/or molybdenum-tungsten alloy to be exposed at high temperatures in use wherein a protective atmosphere is not required during the welding process.

It is another object of this invention to provide an improved spot or seam electric resistance welding process for joining molybdenum, tungsten, and/or molybdenum-tungsten alloy sheets wherein the welds will stand up in high temperature use even in the presence of normally deleterious atmospheres such as nitrogen, hydrogen or oxygen.

These and other objects of the invention will become apparent as the detailed description of the invention proceeds.

The above and other objects are accomplished by the invention which is an improved electric resistance welding process such as spot or seam welding for joining, e. g., two or more sheets of molybdenum, two or more sheets of tungsten, two or more sheets of molybdenum-tungsten alloy, or one or more sheets of molybdenum to one or more sheets of tungsten by means of rhenium interlayers. This welding process can be carried out without the need of a protective atmosphere where the sheets are thin, i. e., of the order of less than about 0.02 inch thick. For welding thicker sheets, it is preferred or necessary to use a protective atmosphere during the welding process if for no other reason than to protect the material of the sheets themselves. The welds produced by the process will stand up in high temperature use even in the presence of such normally deleterious atmospheres as hydrogen, oxygen and nitrogen.

The interlayers of rhenium used in the process can be in the form of foil or thin sheets or in powder form. For some purposes, powder may be preferred to foil since the powder has a higher resistivity than the foil and so more heat will be generated in the rhenium interlayer when using the powder. Normally, the ratio of the thickness of the interlayer to that of the sheets being joined should be in the range of about 0.01 to 0.1 for the best results.

The conventional electric resistance welding method used in my improved process is discussed in detail in Chapter 9 of the book entitled "Welding Engineering," by Bonaface E. Rossi, published by the McGraw-Hill Book Company, Inc., New York, in 1954. Spot and seam welding specifically are discussed on pages 207–209.

Welding conditions such as electrode pressure, welding time, welding current density, etc., would be of the same order of magnitude in this process as in conventional processes described above using tantalum interlayers, except that no protective atmosphere is required in this process for welding thin sheets as it is when using tantalum. As in the case of tantalum, a foil thickness of rhenium of the order of about 0.001 inch would normally be satisfactory depending on the thickness of the sheets being welded. If powdered rhenium rather than foil is used, a powdered layer of about the same order of thickness as the foil layer will be satisfactory.

It is preferred for best results that the whole area of the interlayer take part in the welding process, that is to say that when the weld is completed, there are no unwelded areas between the rhenium and the sheets being welded and yet no direct welds between the sheets themselves.

Although the invention has been described in terms of specific embodiments which are set forth in detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention or the scope of the appended claims.

What is claimed is:

1. In an electric resistance welding process such as spot or seam welding for joining molybdenum and tungsten sheets for high temperature use, the improved step of using rhenium interlayers between the sheets in the welding process to bond the sheets together.

2. The process of claim 1 wherein molybdenum sheets are being welded to molybdenum sheets.

3. The process of claim 1 wherein tungsten sheets are being welded to tungsten sheets.

4. The process of claim 1 wherein molybdenum-tungsten alloy sheets are being welded to molybdenum-tungsten alloy sheets.

5. The process of claim 1 wherein molybdenum sheets are being welded to tungsten sheets.

6. The process of claim 1 wherein rhenium foil forms the interlayers.

7. The process of claim 1 wherein rhenium powder forms the interlayers.

References Cited in the file of this patent

UNITED STATES PATENTS

| | | |
|---|---|---|
| 1,155,426 | Liebmann et al. | Oct. 5, 1915 |

FOREIGN PATENTS

| | | |
|---|---|---|
| 493,741 | Great Britain | Oct. 13, 1938 |
| 404,923 | Germany | Nov. 1, 1924 |